H. CUMMER.
WEIGHING SCALE.
APPLICATION FILED AUG. 7, 1906. RENEWED MAR. 7, 1913.
1,076,486.
Patented Oct. 21, 1913.
2 SHEETS—SHEET 2.
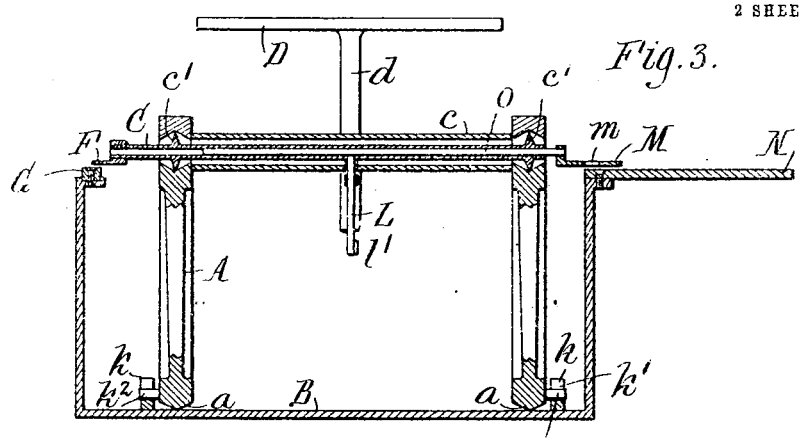
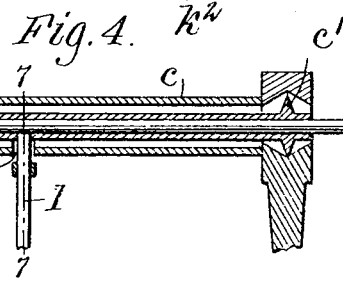
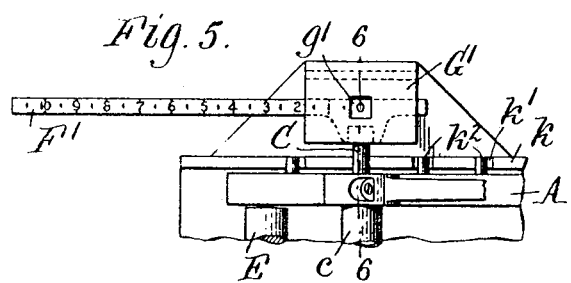
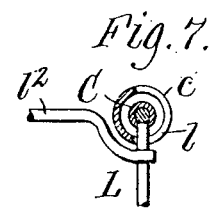
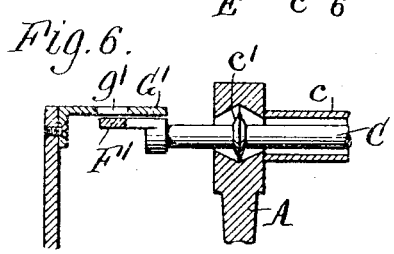
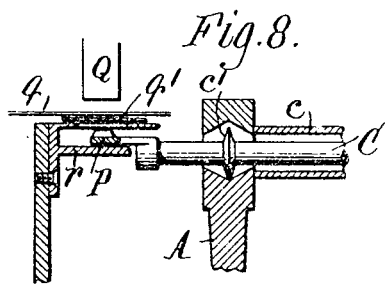
Witnesses:
E. A. Volk.
A. F. Dimond.
Inventor.
Harry Cummer
by Wilhelm, Parker & Hard
Attorneys.

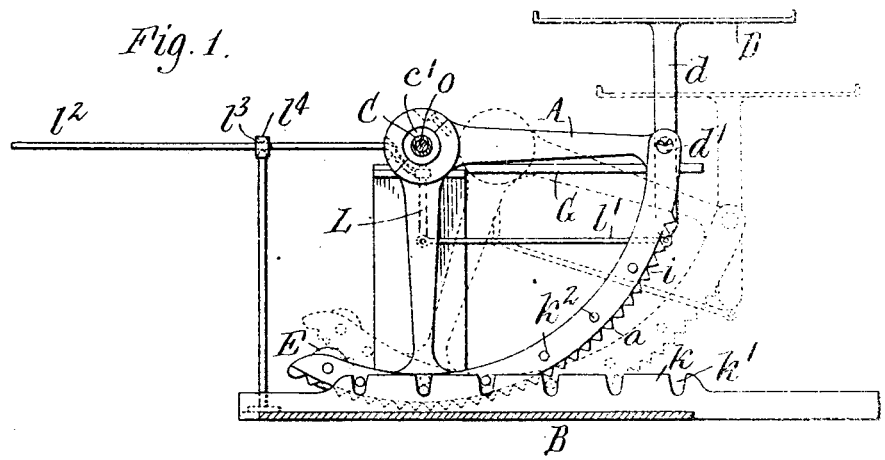
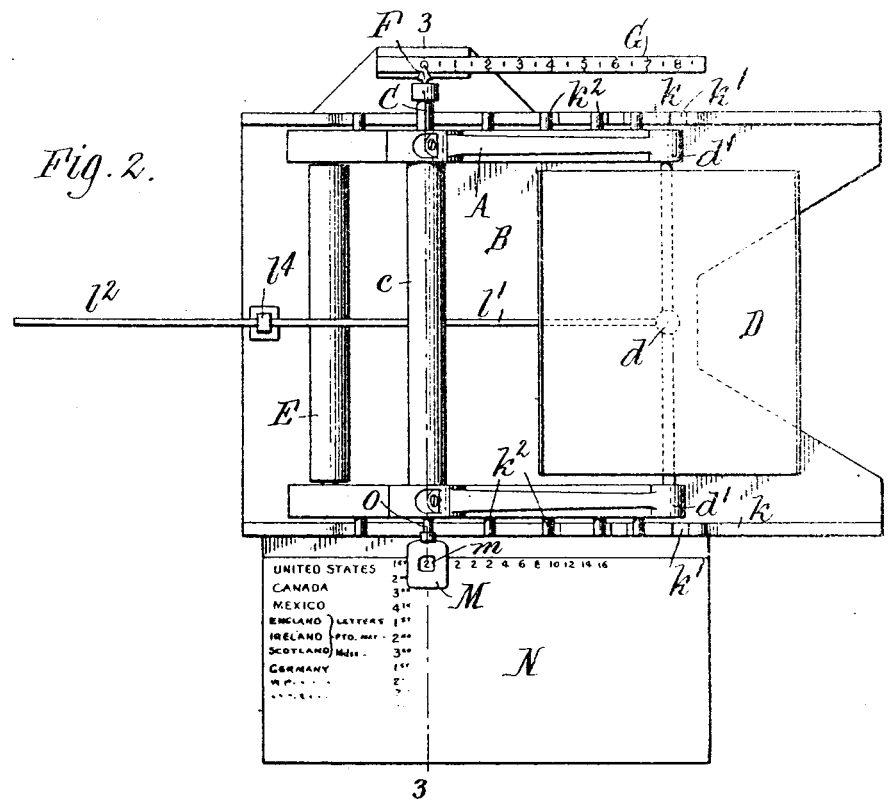

UNITED STATES PATENT OFFICE.

HARRY CUMMER, OF BUFFALO, NEW YORK.

WEIGHING-SCALE

1,076,486.  Specification of Letters Patent.  Patented Oct. 21, 1913.

Application filed August 7, 1906. Serial No. 329,572. Renewed March 7, 1913. Serial No. 752,788.

*To all whom it may concern:*

Be it known that I, HARRY CUMMER, a citizen of the United States, residing at Buffalo, in the county of Erie and State of New York, have invented a new and useful Improvement in Weighing-Scales, of which the following is a specification.

This invention relates to scales or balances in which the equilibrium is automatically established by the shifting of the bearing point of a rocking beam as contradistinguished from the employment of the usual movable counterpoise.

The primary object of the invention is to produce a desirable and efficient scale, either of the ordinary indicating, computing or recording types, of simple and inexpensive construction which requires no spring or counterpoise.

Other objects of the invention are to so construct the scale that the device operated by the rocking beam for indicating or recording the weight or price, or both the weight and price of the material weighed, will be reciprocated in a straight line; to provide simple means for retaining the scale pan always in a horizontal position; and to improve scales of the type mentioned in the respects hereinafter described and set forth in the claims.

In the accompanying drawings, consisting of two sheets: Figure 1 is a longitudinal sectional elevation of a computing, or price indicating, scale embodying the invention.
Fig. 2 is a plan view thereof. Fig. 3 is a transverse sectional elevation thereof, in line 3—3, Fig. 2. Fig. 4 is an enlarged fragmentary transverse section of the beam and indicating devices. Fig. 5 is a fragmentary plan view, on an enlarged scale, of a modified construction of the indicating device. Fig. 6 is a transverse sectional elevation in line 6—6, Fig. 5. Fig. 7 is a detail sectional view of the beam in line 7—7, Fig. 4. Fig. 8 is a fragmentary transverse sectional elevation of a recording device for use with the scale.

Like letters of reference refer to like parts in the several figures.

Figs. 1-3 show the invention applied to a computing or price-indicating scale adapted more especially for weighing postal matter, and this construction will be first described.

A represents the beam, which is of rocker form, having one or more segmental circular treads or bearing faces a. Preferably the beam consists of two like parallel side pieces or rockers resting and adapted to rock upon a supporting surface or surfaces on a suitable base B which is preferably horizontal and flat. The two beam rockers shown are connected and held in the described relation by a hub or sleeve c through which passes an axle C which is journaled or free to turn in the sleeve and is concentric with the bearing faces of the rockers. The axle is preferably held from lateral movement in the sleeve and the friction between the parts reduced by circular knife edge collars or enlargements c' on the axle bearing in V-shaped grooves in the rockers.

D represents the scale pan or platform which, in the scale shown, has a depending leg d with lateral trunnions supported by suitable knife edges in bearings d' at the upper forward ends of the rockers. The scale pan is counterbalanced so as to be normally held in the raised position, shown in Fig. 1, by weighting the opposite ends of the beam.

A weight E supported by and joining the rear ends of the two rockers is shown in the drawings. The beam can be weighted to counterbalance the pan or platform in any other suitable manner. When material is placed upon the scale pan or platform the beam will rock or roll along the supporting base until an equilibrium is established, due to the shifting of the bearing or fulcrum points of the beam. In this rocking or rolling of the beam the axle C will travel in a path parallel with the supporting surface or base B, or in a straight horizontal line in the scale shown, and the weight of the material on the pan or platform can be shown by an index or indicating device attached to the axle C and moving along a relatively fixed graduated scale, or by a graduated scale moved by the axle past a relatively fixed index or pointer. In the construction shown in Figs. 1-3, one end of the axle carries an index or pointer F which moves along a relatively stationary graduated scale bar G provided with weight indicating characters. Figs. 5 and 6 illustrate a reversal of these indicating means, in which a bar F' provided with weight indicating characters is fixed to the axle C and is moved thereby beneath a relatively stationary shield G' having an opening g' through which the character on the bar directly beneath the opening can be seen.

The treads or bearing edges of the beam rockers are preferably reduced or have knife edges to reduce the friction between them and the supporting surface, and they are also preferably notched, as indicated at $i$ in Fig. 1, so that the beam will rock from point to point of its bearing edges and will come to rest with two adjacent points of each rocker bearing on the supporting surface. When an equilibrium is established therefor the beam will remain stationary and not oscillate back and forth, thereby giving a more certain or accurate reading of the weight of the material. The action of the beam is especially desirable when the scale is provided with recording means, as the recording characters will then be brought to a definite position opposite the impression device and held stationary while the impression is made.

Suitable means are preferably employed to prevent the beam rockers from shifting or sliding on the supporting surface or base and thereby causing the indicator to give an incorrect reading. For this purpose, the base B shown is provided adjacent to the beam rockers with upright flanges $k$ provided with open ended notches $k'$ to successively receive pins $k^2$ projecting laterally from the rockers. The notches are slightly larger than the pins to prevent actual contact of the latter with the edges of the slots in the normal operation of the beam. The pins and slots do not, therefore, appreciably affect the free movements of the beam but serve to prevent the horizontal shifting or displacement of the beam on the base. The following means are also preferably provided for retaining the scale pan in the horizontal position: A leg or post L, Figs. 1 and 3, is fixed to the axle C and depends therefrom through a slot $l$ in the beam hub, and a link or rod $l'$ is pivoted at opposite ends to the leg of the scale pan or platform and said post L, at equal distances from the axes of oscillation of the beam and the scale pan. A rod $l^2$ is fixed at one end to the post L, or is otherwise connected to the axle C, and slides through a guide opening $l^3$ in a suitable bearing part $l^4$. The guide opening is reduced or has a knife edge to decrease the friction. This rod $l^2$ slides freely through its bearing opening as the axle reciprocates with the rocking of the beam and holds the axle from turning. The link $l'$ acts in the same manner as the ordinary parallel link to hold the pan or platform horizontal. Any other suitable means for thus holding the axle from turning and maintaining the horizontal position of the pan or platform could be employed.

The scale above described is adapted for indicating the price of different materials weighed thereon, and for this purpose, in the construction shown, the end of the axle C opposite to the index or pointer F is provided with a shield or plate M having an opening $m$ which moves over a price plate N provided with price indications adapted to be successively exposed to view through the opening of the shield. The scale illustrated is intended for weighing postal matter, and the price plate is provided with characters to indicate the amount of postage, domestic or foreign, for the different classes of mail matter, the prices for different classes of mail matter being arranged in parallel rows on the plate. The opening of the shield is preferably only large enough to disclose one character or indication in any one position of the shield, so as to avoid confusion in the use of the scale, but the shield is adapted to be shifted to a position with its opening above either of the rows of characters. The shield shown is carried by a rod O arranged to slide in the hollow axle C to enable such shifting thereof. The construction just described for indicating the price of the material being weighed is simply given as an example and price-indicating or computing means of any other suitable construction could be employed.

Fig. 8 shows means for recording the weights, preferably consisting of a type-bar P which is mounted on or connected to the axle C in some suitable manner so as to be moved by the axle to place the different type, which are provided with characters indicating the different weights, beneath a recording plunger or impression device Q. A record sheet $q$ and an ink ribbon or marking sheet $q'$ of any suitable sort are arranged one above the other, between the impression device and the type-bar, and when the impression device is forced down the record sheet and marking sheet or ribbon will be pressed against the type beneath the impression device and an impression made on the record sheet by the type, which will indicate the weight of the material on the pan at the time the impression is made. The notched bearing edges of the beam rockers above mentioned insure the proper registration of the type with the impression device and hold the type-bar stationary during the production of the record, so that a perfect impression will be secured and there will be no possibility of the record sheet being pressed against two adjacent type. A bed or part $r$ can be provided beneath the type-bar to afford a solid support for the same and prevent the flexure of the bar and relieve the bearings of the axle from pressure when making an impression. This recording mechanism is described to furnish an example of the adaptation of the invention to a recording scale.

Any other suitable recording mechanism could be employed in place of that shown and described.

I claim as my invention:

1. The combination of a supporting surface, a beam having a curved bearing tread arranged to rock on said supporting surface, means connected to said beam for supporting the article to be weighed, an indicating device, and connections between said indicating device and said beam which cause said indicating device to move in a path parallel with said supporting surface, substantially as set forth.

2. The combination of a supporting surface, a beam having a curved bearing tread arranged to rock on said supporting surface, means connected to said beam for supporting the article to be weighed, and an indicating device which is connected to said beam concentrically with said curved tread and moves therewith in a path parallel with said supporting surface, substantially as set forth.

3. The combination of a horizontal supporting surface, a beam having a curved bearing tread arranged to rock on said supporting surface, means connected to said beam for supporting the article to be weighed, and an indicating device which is mounted on said beam concentrically with said curved tread and is moved thereby in a straight horizontal path, substantially as set forth.

4. The combination of a supporting surface, a beam having a curved bearing tread arranged to rock on said supporting surface, means connected to said beam for supporting the article to be weighed, an indicating device which is movably connected to said beam concentrically with said curved tread and is moved thereby in a path parallel with said supporting surface, and means for holding said indicating device from rocking with said beam, substantially as set forth.

5. The combination of a supporting surface, a beam having a curved bearing tread arranged to rock on said supporting surface, means connected to said beam for supporting the article to be weighed, an axle journaled on said beam concentrically with said curved tread, and an indicating device connected to said axle, substantially as set forth.

6. The combination of a supporting surface, a beam having rockers with curved bearing treads adapted to rock on said supporting surface and carrying a pan or platform, and an indicating device loosely mounted on said beam concentrically with the curved treads of said rockers, substantially as set forth.

7. The combination of a supporting surface, a beam having a curved bearing tread arranged to rock on said supporting surface, means connected to said beam for supporting the article to be weighed, and a device provided with characters connected to said beam concentrically with said curved tread and moved thereby, substantially as set forth.

8. The combination of a supporting surface, a beam having a curved bearing tread arranged to rock on said supporting surface, means connected to said beam for supporting the article to be weighed, a device provided with recording characters connected to said beam and moved thereby in a path parallel with said supporting surface, and recording means coöperating with said device having the characters, substantially as set forth.

9. The combination of a supporting surface, a beam having a curved bearing face arranged to rock on said supporting surface, means connected to said beam for supporting the article to be weighed, a device provided with characters connected to said beam concentrically with said curved bearing face and moved thereby parallel with said supporting surface, and recording means coöperating with said character device to produce a record, substantially as set forth.

10. The combination of a plain supporting surface, a beam having a curved tread with spaced bearing projections arranged to rock on said supporting surface, means for preventing displacement of the beam on said surface, and means connected to the beam for supporting the article to be weighed, substantially as set forth.

11. The combination of a supporting surface, a beam having a curved bearing face arranged to rock on said supporting surface, a pan or platform pivoted to said beam, and means carried by the beam and connected with a part independent of said beam to hold said pan or platform substantially horizontal, substantially as set forth.

12. The combination of a beam having a curved bearing face arranged to rock on a supporting surface, a pan or platform pivoted to said beam, an axle journaled on said beam, means for holding said axle from rocking with the beam, and means connecting said axle and said pan or platform to hold the latter horizontal, substantially as set forth.

13. The combination of a beam having a curved bearing face arranged to rock on a supporting surface, a pan or platform pivoted to said beam, an axle journaled on said beam concentrically with its bearing face, a sliding rod connected to said axle, and a link connected to said axle and pan or platform to hold the latter horizontal, substantially as set forth.

14. The combination of a rocking scale beam, an axle arranged concentrically with the arc of movement of the beam, and bearings for said axle consisting of circular collars thereon which roll and are confined in circular sockets in the beam, and an indicating device connected to said axle, substantially as set forth.

15. The combination of a rocking scale beam, a part and means for holding said part from rocking with said beam, and a bearing between said beam and said part consisting of a circular thin edged bearing portion on one of said parts and a circular portion on the other part on which said thin edged bearing portion rolls, and means for preventing lateral movement of one of said bearing portions on the other, substantially as set forth.

Witness my hand, this 28th day of July, 1906.

HARRY CUMMER.

Witnesses:
C. B. HORNBECK,
A. L. McGEE.